Patented Dec. 12, 1933

1,939,075

UNITED STATES PATENT OFFICE 1,939,075

COATING COMPOSITION FOR ELECTRON-EMITTING ELEMENTS

Leon McCulloch, Pittsburgh, Pa., assignor to Westinghouse Electric & Manufacturing Company, a corporation of Pennsylvania No Drawing. Application January 3, 1927
Serial No. 158,827

6 Claims. (Cl. 250—27.5)

My invention relates to coating compositions which include salts of alkaline earth metals and specifically to compositions that are adapted for producing coated elements for use in electron-emitting devices.

It is among the objects of my invention to provide a material that will produce a relative thick and strongly-adherent coating of oxide material which will not flake or break away from the filament or other body to which it is applied.

Another object of my invention is to provide a composition in which an alkaline-earth oxide is uniformly distributed therethrough.

Another object of my invention is to provide a suspension of alkaline earth salts that is capable of being decomposed to the oxide without oxidizing the foundation metal and that will produce a coating free from carbonaceous residue when heated.

Still another object of my invention is to provide a material that is sufficiently cohesive to permit its use in a manner similar to that of a paint.

Heretofore, compounds of alkaline-earth metals have been provided either alone in an aqueous solution, or with mixtures of other substances, such as resinates, gelatin, paraffin, or other colloid-producing materials. Coatings containing the colloid protective materials produce a carbonaceous or carbon like residue that is difficult to completely, or with a high degree of certainty, remove from the interior of the body of oxides of the alkaline-earth metal that is formed when the coated filament is heated.

In forming coatings from other compounds of alkaline-earth metals, such as solutions of the acetate, it is necessary to successively apply thin films of the solution and to convert the films to oxides. Such processes of producing coatings are difficult to practice where the foundation body is larger than a filament wire. Moreover, the successive coating and heating may result in a loose flaky coating. Such results are especially noticeable where relatively thick coatings are attempted.

My invention provides a coating material that is characterized by a perfect suspension of finely divided alkaline-earth carbonates in an aqueous solution of salts of the alkaline earths, and the composition is a viscous paint-like material. The acid radical of the salt that is utilized in my composition is one which does not form a carbonaceous residue when the coating is converted to the oxide by heating. The nature of the metallic salts formed in the mixture is such that a relatively heavy suspension or emulsion is maintained, and a relatively thick coating can be produced with but one immersion of the foundation body in the coating composition.

In practicing my invention, I prefer to utilize a finely divided carbonate or oxalate of one or more of the alkaline-earth metals and form a suspension of the same in a water solution containing an alkaline-earth salt of an acid which yields the oxide of the metal when heated and does not form a carbonaceous residue when it is decomposed. Among the acids which are suitable for forming salts for my purposes are acetic, formic, nitric and hydronitric acids. The acids form the corresponding salts of the various alkaline-earth metals and I may use one of the acids or a mixture of two or more of them with one or more of the various alkaline-earth salts. The essential feature of the acid is that the alkaline-earth salt thereof must be capable of decomposing, when heated, without leaving a carbonaceous residue.

One of the preferred coating compositions made in accordance with my invention includes the mixed carbonates of barium, strontium and calcium, and is prepared as follows:

I first make a mixture of the ingredients by dissolving equal parts, by weight, of the nitrates of barium, strontium and calcium in water, and then adding sodium carbonate, and precipitating the mixed carbonates. The carbonates are separated from the solution, thoroughly washed and dried. No special precautions are necessary in this operation other than that it is generally desirable to conduct the precipitation under such conditions that finely divided particles, rather than coarse particles, will be produced.

The coating composition is prepared from the mixed carbonates by adding and thoroughly mixing a 15% acetic acid solution to the mixed dried carbonates in the preferred proportion of 16 grams of the carbonates to ten cubic centimeters of the acid. A portion of the carbonates is converted to acetates and another portion thereof remains as a suspension in the acetate solution. The preferred proportion of acid and water is such that the material produced will be a paint-like substance having about the consistency of thick cream. The composition operates in a manner similar to paint in that the carbonates do not separate from the water solution when they are applied to the object to be coated.

Instead of forming the salt from the acid, I may add a solution of the alkaline-earth salt in water to the dry carbonate. The presence of the salt solution in the carbonate produces a viscous material that is not produced when the carbonate is merely moistened. The salt of acetic, formic, hydronitric or nitric acid is preferred as the binder, since it has a specific adhesive effect in producing the desired composition.

I may add a solution of one or more of the salts of the alkaline-earth metal to the alkaline-earth carbonate. For example, I have found that a mixture of 10 grams of the mixed carbonates, 5 cc of water and 10 cc of a saturated solution of barium trinitride forms a particularly useful composition. The mixture consists of about 6% barium trinitride, 5% water and 37% of the alkaline-earth carbonate. When the coating formed from this composition is heated, the carbonate and nitride decompose to form the earth oxide and gases, whether or not oxygen is present in the surrounding gas. If oxygen is not present and the material is heated, the oxygen for forming the oxide from the nitride is supplied by the carbonate. Therefore, I may coat a body, such as a cathode element, with my composition and mount it in a tube, and then convert the coating to an oxide in any appropriate manner.

The composition is useful in forming coatings on filaments or rods where thick, uniformly adherent coatings are desired. As one coating of my composition is sufficient for most purposes, I avoid the oxidation on the foundation metal that often occurs in the practice of other methods where successive coating and heating is required.

An electron-emitting body may be prepared by painting the composition on the surface of the body or by dipping the body in the composition. The coating may be air-dried, assembled in a vacuum device and then heated to a sufficient temperature to convert the alkaline-earth salts to oxides.

Instead of the mixed carbonates enumerated, I may use other mixtures of carbonates or one of the carbonates alone in making my coating composition. If desired, I may utilize another acid, such as formic or nitric acid, or the salts thereof may be substituted for the acid and used along or in conjunction with another acid. I may also substitute for the carbonates, other solid compounds, such as the oxalates of the alkaline earths, provided the compound is capable of being decomposed, when heated, without leaving a carbonaceous residue.

A compound formed in the above described manner has relatively great consistency and viscosity and is capable of being decomposed, with the formation of a metal oxide and without the formation of a carbonaceous residue when the coating is calcined.

Although I have described certain specific embodiments of my invention, other modifications, such as variations in the proportions of acid, soluble salt or water, may be made without departing from the spirit of my invention, the scope of which is defined in the annexed claims.

I claim as my invention:

1. A coating composition comprising a mixture of one or more carbonates of the alkaline-earth metals and a binder, said binder including an aqueous solution of an acetate of such metal.

2. A coating composition comprising a mixture of barium, strontium and calcium carbonates and a binder including an aqueous solution of an alkaline earth metal acetate.

3. A coating composition comprising a mixture of alkali-earth metal salt, from a group consisting of carbonate and oxalate, and a binder including an aqueous solution of alkali-earth metal salt from a group consisting of acetate, formate and hydronitride.

4. A coating composition comprising a mixture of barium, strontium and calcium carbonates and a binder including an aqueous solution of alkali-earth metal salt from a group consisting of acetate, formate and hydronitride.

5. The method of making a coating composition which comprises mixing an aqueous solution of acid related from a group consisting of acetic, formic, hydronitric and nitric with alkali-earth metal salt selected from a group consisting of carbonate and oxalate, the acid being present in quantity insufficient to combine with all the salt.

6. The method of making a coating composition which comprises mixing an aqueous solution of acid related from a group consisting of acetic, formic, hydronitric and nitric with alkali-earth metal salt selected from a group consisting of carbonate and oxalate, the acid being present in about a third molecular proportion to the salt.

LEON McCULLOCH.